United States Patent

[11] 3,600,665

[72] Inventors Brian R. Pelly
Murrysville;
Richard H. Osman, Pittsburgh, both of, Pa.
[21] Appl. No. 862,426
[22] Filed Sept. 30, 1969
[45] Patented Aug. 17, 1971
[73] Assignee Westinghouse Electric Corporation
Pittsburgh, Pa.

[54] FIRING CIRCUIT FOR GATE-CONTROLLED POWER SWITCHES
13 Claims, 6 Drawing Figs.
[52] U.S. Cl. ................................................. 323/16,
307/252 A, 323/23, 323/38
[51] Int. Cl. ....................................................... G05f 3/00
[50] Field of Search .......................................... 307/252 C,
252 N, 252 Q, 252 H; 323/22 SC, 38, 16, 19, 23, 25

[56] References Cited
UNITED STATES PATENTS
3,173,077 3/1965 Kirk et al. .................... 323/22 X (SCR)
3,154,695 10/1964 MacGregor et al. ........... 307/252 X
3,300,622 1/1967 Swain .......................... 323/22 X (SCR)
3,440,517 4/1969 Page et al. ................... 323/22 X (SCR)

OTHER REFERENCES
Koranye, T. D., " Closure of AC Line at Zero Voltage Using Triacs," IBM Technical Disclosure Bulletin, Vol. 10, No. 7, December 1967, pg. 894 (copy in 323-22 SCR).

Primary Examiner—J. D. Miller
Assistant Examiner—A. D. Pellinen
Attorneys—F. H. Henson, C. F. Renz and M. P. Lynch ABSTRACT: A firing control circuit comprised of a current source, a current-storage device responsive to current from the current source and a switching element which applies the stored current in the form of firing pulses to gate-controlled switches in response to ON-OFF conductive states determined by a timing pulse generator circuit.

INVENTORS
Brian R. Pelly and
Richard H. Osman
BY Michael P. Lynch
ATTORNEY

FIRING CIRCUIT FOR GATE-CONTROLLED POWER SWITCHES

BACKGROUND OF THE INVENTION

1. Field of the Invention

This invention relates in general to firing circuits for gate-controlled switches and more particularly to a firing circuit for generating firing pulses exhibiting fast rise times and extended durations.

2. Description of the Prior Art

In circuits utilizing gate-controlled conduction devices, or power switches, such as power supply systems, i.e. inverter coating converter circuits, high voltage AC systems, transformer tap changer systems, etc., there exists a requirement for firing circuits which provide controlled firing or gating of the power switches. Typical power switches include the thyristor and the silicon-controlled rectifier (SCR).

The gating of power switches in a high voltage DC (HVDC) bridge circuit for example is especially critical in that a plurality of switches are connected in series in each leg of the bridge circuit. In the HVDC converter circuit it is necessary to provide control circuits to transmit fast-rising and well-synchronized firing pulses to all the series-connected switches in a bridge leg. In order to ensure proper operation of the converter under all conditions, it is desirable to apply "extended" firing pulses to the gate circuit of the switch. For example, in a three-phase HVCE converter bridge circuit, a firing pulse having a duration of 120° would be desirable.

The requirement for a relatively simple control circuit for developing fast-rise, extended-duration power switch firing pulses has not been satisfied by currently available control circuits.

SUMMARY

The invention comprises a firing control circuit exhibiting a high level of insulation from ground potential and capable of developing fast-rise, extended-duration current pulses for firing power switches.

An active switching device, such as a gate-controlled switch, is operatively connected in the gate circuit of each power switch; the duration of conduction of the gate control switch determines the duration of the pulse of firing current applied to the power switch.

The firing signal for each power switch is developed from an electrical storage element of the inductance type which is connected in series via a current-rectifier circuit, with a first secondary winding of a current transformer. A continuous alternating current is supplied to the primary winding of the current transformer by a primary current source; this current is transformed by the current transformer rectified into unidirectional pulses, stored in the inductor and permitted to circulate through the gate-controlled switch. When required, the stored current is released into the gate circuit of the power switch by switching off the gate-controlled switch. The gate-controlled switch conduction is controlled by a short-duration pulse developed at a second secondary winding of the current transformer by a trigger pulse generator circuit connected across the primary transformer winding. The energy stored in the inductive element is at least sufficient to provide the initial fast-rising current required to initiate power switch conduction. The subsequent continuous pulse of current delivered to the gate of the power switch is provided partially by the energy stored in the inductive element and partially by the primary current source through the current transformer and rectifier circuit. The conduction of the power switch may be terminated at any desired instant by initiating an ON trigger pulse which is transformer coupled from the trigger pulse generator circuit to the gate-controlled switch.

It is therefore an object of this invention to store electrical energy locally at a power switch and to release this energy in the form of a power switch gating pulse by means of firing pulses.

DESCRIPTION OF THE PREFERRED EMBODIMENT

Figure 1:
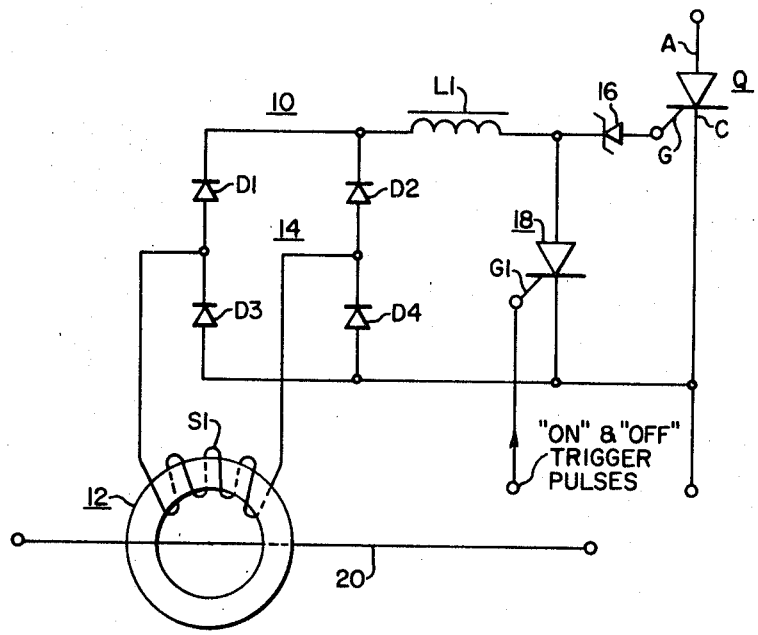
FIG. 1 is a basic schematic embodiment of the invention.

Referring to FIG. 1 there is illustrated schematically a firing control circuit 10 operatively connected to the gate G—cathode C circuit of a controlled-conduction power switch Q. The power switch Q represents any one of numerous controlled-conduction power-switching devices having an anode A, a cathode C and a gate G electrode, such as thyristor, silicon-controlled rectifier (SCR), etc., which are commonly used in sets in converter and inverter circuits to develop waveforms as a result of the programmed conduction of the power switches for prescribed periods of time.

Figure 6:
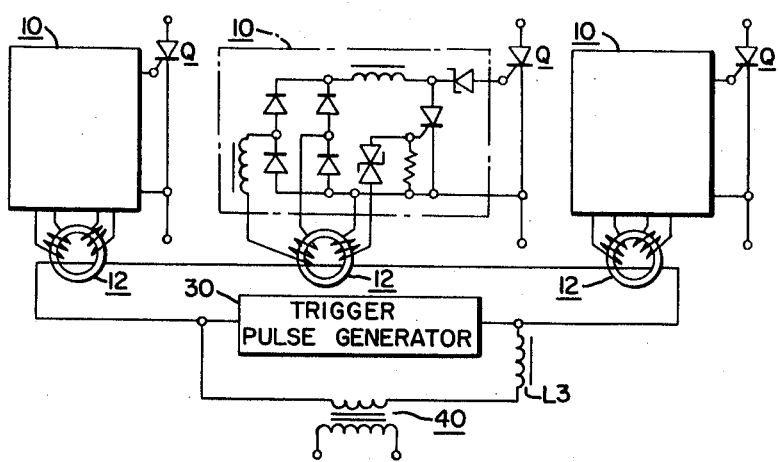
FIG. 6 is a schematic illustration of an interconnecting scheme for a plurality of the embodiment illustrated in FIG. 2.

Control circuit 10 includes a current transformer 12, a rectifier circuit 14 and an inductor L1 which form an electrical energy storage circuit, a zener diode 16, and a switching element 18 shunting the gate-cathode circuit power switch Q. The control circuit 10 operatively associated with power switch Q would by duplicated for each power switch in a system employing a plurality of power switches as illustrated in FIG. 6.

In operation, continuous alternating current, typically 60 Hz., is supplied to the primary winding cable 20 of the current transformer 12 from a suitable source (not shown). Assume for the purpose of explanation that the switch 18, illustrated as a gate-controlled switch, is in a state of conduction as a result of a trigger ON pulse having been applied to the gate electrode G1 by a trigger pulse generator (not shown). The alternating current half cycles are directed through the inductor L1 and switch 18 by the rectifiers D1—D4, and D2—D3 forming diagonal legs of the bridge rectifier circuit 14. The breakdown voltage of the zener diode 16 is greater than the forward conduction voltage of the switch 18 thus resulting in the zero current flow to gate G of power switch Q and total current flow through switch 18. Switch 18 functions as a current shunt across the gate-cathode circuit of power switch Q. The current induced into the secondary winding S1 of transformer 12 and forced through the inductor L1 develops a current storage in the inductor L1 sufficient to trigger power switch Q to a state of conduction.

Figure 3:
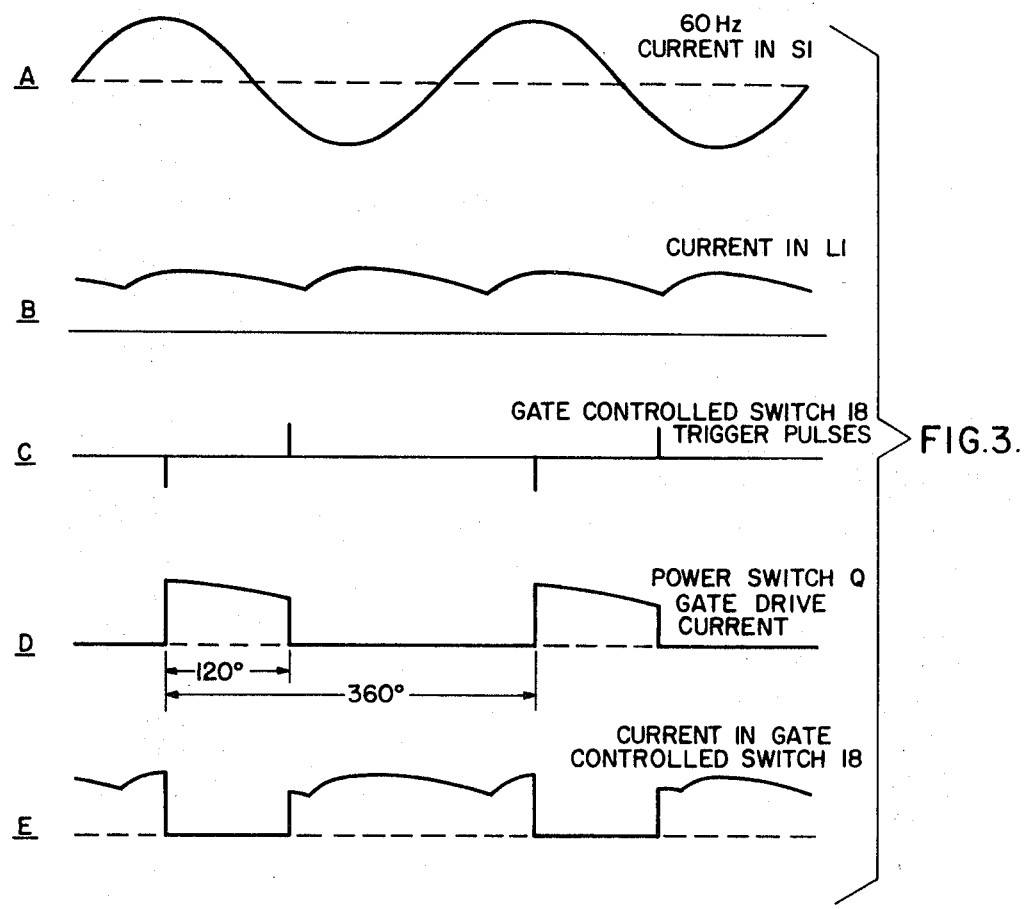
FIG. 3 is a graph of waveforms corresponding to the operation of FIGS. 1 and 2.

In the event an OFF trigger pulse is applied to the gate electrode G1 of switch 18 the current stored in the inductor L1 is instantaneously diverted through the zener diode 16 to the gate electrode G of power switch Q to render power switch Q conductive between anode A and cathode C. The triggering current to the gate electrode G of power switch Q from firing control circuit 10 continues until an ON trigger pulse is subsequently applied to the gate electrode G1 of switch 18. The gating sequence and conduction duration of power switch Q is determined by the ON-OFF pulse pattern applied to the gate electrode G1 of switch 18. The waveforms corresponding to the control circuit components for a typical power switch Q conduction duration of 120°, which would be desirable in a three-phase converter bridge circuit, are illustrated in FIG. 3.

Figure 2:
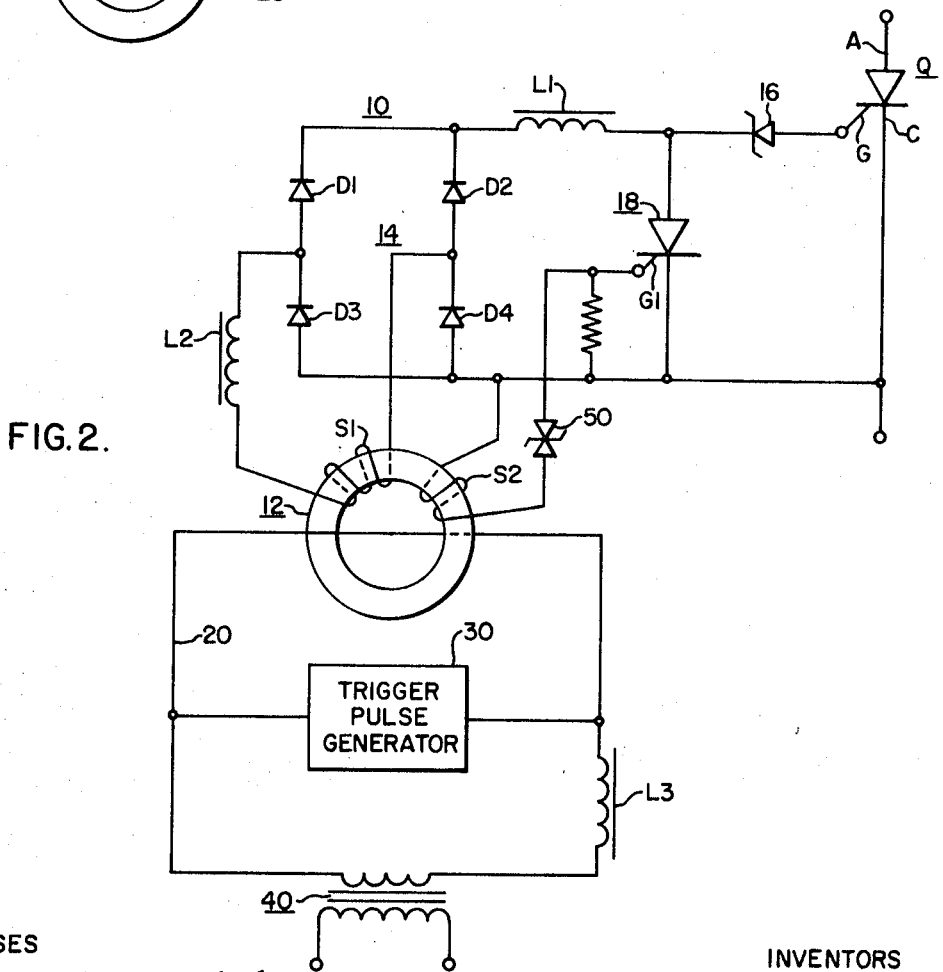
FIG. 2 is a modification of the embodiment of FIG. 1 including a trigger pulse generator.

A typical embodiment of the basic schematic illustration of FIG. 1 is depicted in FIG. 2 in which a trigger pulse generator 30 is connected in parallel with an alternating current source, transformer 40, to the primary winding cable 20 of the current transformer 12.

In addition to the secondary winding S1 of the current transformer 40 and the bridge circuit 14, a second secondary winding S2 is provided for the purposes of coupling the ON-OFF trigger pulses of the trigger pulse generator 30 to the gate electrode G1 of switch 18.

The breakdown and conduction voltage of a bidirectional conduction diode 50, which is connected in series between the secondary winding S2 and the gate electrode G1, are greater than the peak voltage developed across the secondary winding S2 due to the alternating current flow in secondary winding S1. Therefore, no alternating current developed by transformer 40 flows in secondary winding S2.

Figure 4:
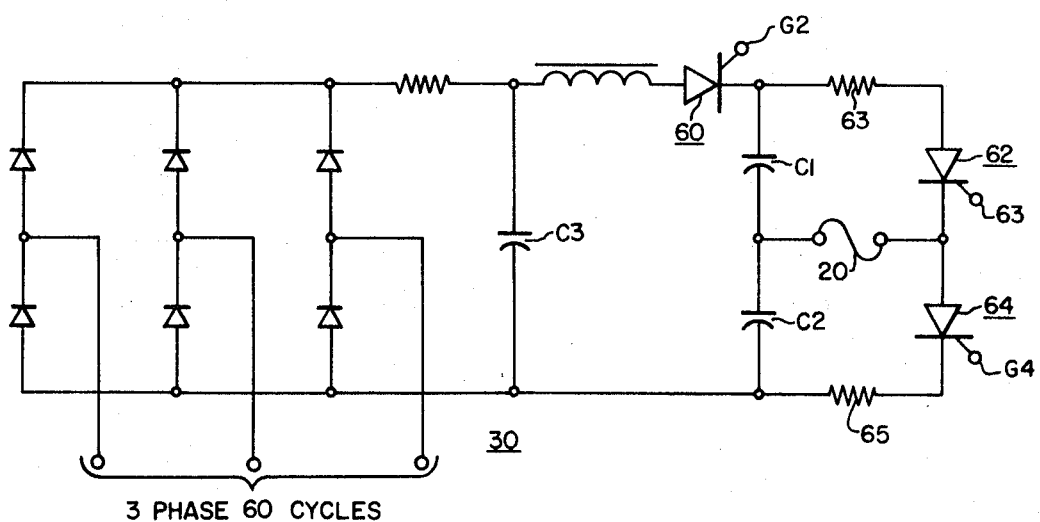
FIG. 4 is a schematic diagram of a typical embodiment of the trigger pulse generator of FIG. 2.

The trigger pulse generator 30 which is illustrated schematically in FIG. 4 generates fast-rising, short-duration ON-OFF pulses of current into the primary winding cable 20 in a sequence dictated by the desired conduction durations of power switch Q. The magnitude of the generated pulses is sufficient to develop a voltage drop across the secondary winding S2 sufficient to render the diode 50 conductive and produce current conduction through the gate circuit G1 of switch 18. The polarity of the generator pulses and the sequence and rate at which they are generated, as illustrated in waveform C of FIG. 3, determines the ON-OFF condition of switch 18. As noted above, the ON-OFF condition of switch 18 controls the gating of power switch Q by the current stored in the inductor L1.

Inductors L2 and L3 are included to provide desired electrical isolation between the output of trigger pulse generator 30 and the secondary covered S1 and between the trigger pulse generator 30 and the alternating current transformer 40 respectively. The impedance of L2 to current flow is sufficient to render the secondary winding S1 nonresponsive to the fast-rise, short-duration output pulses of the trigger pulse generator 30. The purpose of inductor L3 is to prevent the output of trigger pulse generator 30 from flowing in the transformer 40, which supplies 60 Hz. current to the primary winding cable 20.

The waveforms of FIG. 3 illustrate the operation of the control circuit 10. Waveform A represents the 60-hertz alternating current developed in secondary winding S1 by the current flow maintained in the primary winding cable 20 by transformer 40. Waveform B illustrates the continuous current flow through the inductor L1 establishes by the bridge rectifier circuit 14. As evidenced in the waveforms, as the 60-hertz alternating current (waveform A) in winding 51 decreases, the peak current is "trapped" in the inductor L1, and this current is free to circulate through the bridge circuit 14. Due to the forward conduction voltage of the bridge rectifier D1, D2, D3 and D4, the series resistances of inductors L1 and L2, and the impedance of the gate circuit of switch Q in conjunction with the zener diode 16, the current decays slightly, but is replenished to the peak value of the alternating current during the next half cycle.

The programmed pulses of trigger pulse generator 30, which gate switch 18 ON-OFF, are illustrated in waveform C. The pulse pattern of waveform C functions to segment the waveform B into the power switch Q gating waveform D which is initiated when a negative trigger pulse renders switch 18 nonconductive, and waveform E which represents switch 18 conduction period initiated by a positive trigger pulse.

Figure 5:
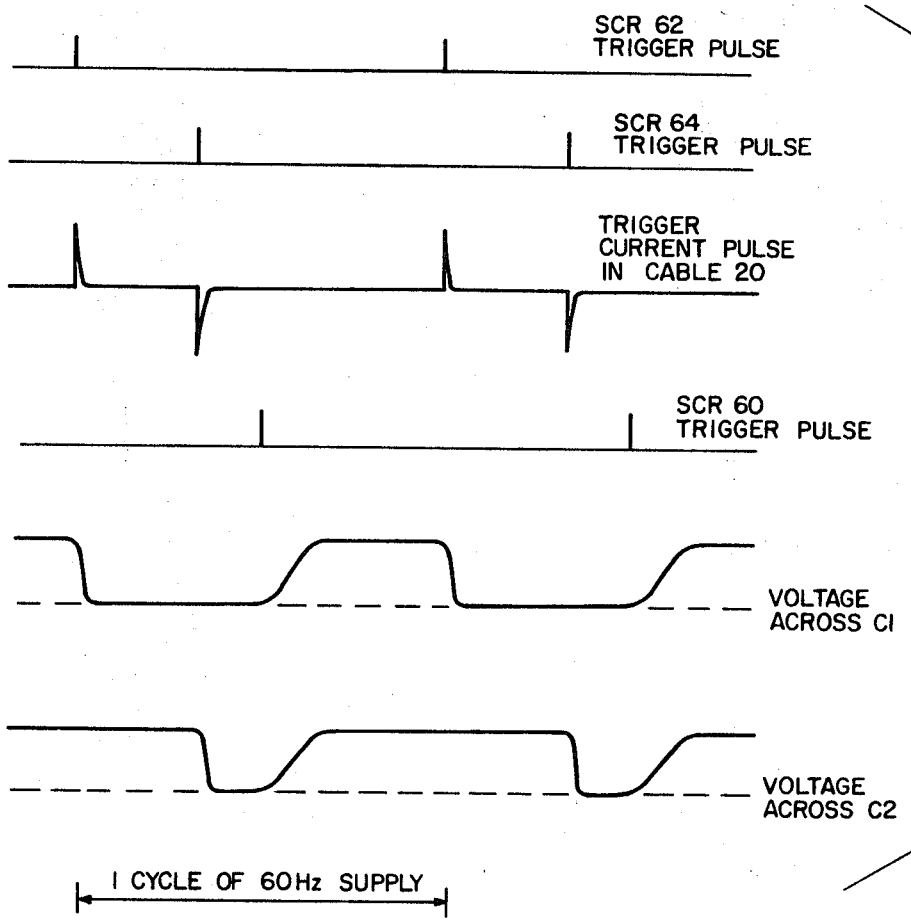
FIG. 5 is a graph of waveforms for the trigger pulse generator of FIG. 4.

In FIG. 4 an embodiment of the trigger pulse generator 30 of FIG. 2 is schematically illustrated. The waveforms of the components of the trigger pulse generator 30 are illustrated in FIG. 5. For the purpose of describing the operation of circuit 30 of FIG. 4, assume initially that the capacitors C1 and C2 are discharged and a firing pulse from a control circuit (not shown) is applied to the gate electrode of the SCR 60 to render SCR 60 conductive. The voltage developed across capacitor C3 by the bridge rectifier circuit 70 in response to a voltage source (not shown) charges series-connected capacitors C1 and C2 through the SCR 60. The SCR 60 is then turned OFF by the natural tendency of the capacitor-charging current to reverse. At a desired time subsequent to the charging of capacitors C1 and C2 the SCR 62 is rendered conductive by a pulse applied to the gate electrode G3, and capacitor C1 discharges through resistor 63 and SCR 62 into the primary winding cable 20, thus producing a trigger pulse of the first polarity. The SCR 62 turns OFF after the discharge of capacitor C1 is completed. Similarly at some desired time later a pulse is applied to the gate electrode G4 of the SCR 64 resulting in the discharge of the capacitor C2 through the resistor 65 and SCR 64 into the primary winding cable 20, thus producing a trigger pulse of a second polarity. The SCR 64 turns OFF after the discharge of capacitor C2 is completed. At sometime later the SCR 60 is again rendered conductive and the cycle is repeated.

The firing control circuit 10 thus disclosed provides for the storage of energy locally at the gate of a power switch Q and for controlling of this energy by means of trigger pulses transmitted through the same cable 20 which supplies the local energy.

In addition to the use of firing control circuit 10 with electrical power systems such as inverters and converters, the firing control circuit 10 can be employed in a tap charger switching system in conjunction with an electrical power system which includes an electrical inductive apparatus, such as a transformer, which has a first winding connected to an alternating potential source and a second winding having a plurality of tap connections connected to a load through the tap charger switching system. The selective firing of power switches operatively associated with each tap connection can be implemented by the firing control circuit 10.

Various modifications may be made within the scope of this invention.

We claim:

1. A firing control circuit for a conduction-controlled switch having an anode electrode, a cathode electrode and a gate electrode comprising, an electrical energy storage circuit including an inductive element operatively connected to the gate electrode of said conduction-controlled switch, a source of electrical energy continuously operatively connected to said electrical energy storage circuit to maintain continuously a level of stored energy in said inductive element sufficient to render said switch conductive, said electrical energy storage circuit providing a continuous current to the gate electrode of said switch, said current being of a magnitude sufficient to render said switch conductive and circuit means including a second conduction-controlled switching device connected in a shunting relationship between said gate and cathode electrodes of said conduction-controlled switch for controlling the flow of current from said electrical energy storage circuit to the gate electrode of said switch to render said switch conductive for a predetermined period of time.

2. In apparatus as claimed in claim 1 including a pulse generator circuit, said pulse generator circuit supplying pulses to control the ON-OFF condition of said conduction-controlled switching device, the ON condition of said conduction-controlled switching device effectively establishing a shunting path for the stored current of said inductive element to prevent firing of said power switch to a conductive state, the OFF condition of said conduction-controlled switching device functioning to divert the stored current to the gate electrode of said power switch to render said power switch conductive.

3. In apparatus as claimed in claim 2 wherein the period of conduction of said power switch is determined by the spaced-apart relationship of the ON-OFF pulse generator circuit output pulses.

4. In apparatus as claimed in claim 2 including means for operatively isolating the source of electrical energy from the pulse generator circuit.

5. In an electrical power supply system including a plurality of power switches, each power switch having an anode electrode, a cathode electrode and a gate electrode, said power switches rendered conductive in response to firing pulses, the combination comprising, an electrical energy storage circuit including an inductive element operatively connected to the gate electrode of each said power switches, a source of electrical energy continuously operatively connected to said electrical energy storage circuit to maintain continuously a level of stored energy sufficient to render said power switch conductive, said electrical energy storage circuit providing a continuous current to said gate electrode of said power switch, said current being of a magnitude sufficient to render said power switch conductive, and circuit means including a conduction-controlled switching device connected in shunting relationship between said gate and cathode electrodes of said power switch for controlling the flow of current from said electrical energy storage circuit to the gate electrode of said power switch to render said power switch conductive for a predetermined period of time.

6. In apparatus as claimed in claim 5 including a current transformer coupling said source of electrical energy to said electrical energy stored circuit, said source of electrical energy being an alternating current source.

7. In apparatus as claimed in claim 6 wherein said current transformer includes a primary winding and at least a first secondary winding, said primary winding connected to said alternating current source and said electrical energy storage circuit operatively connected to said first secondary winding said inductive element responding to the cyclic current output of said alternating current source by developing a stored current value sufficient to render said power switch conductive.

8. In apparatus as claimed in claim 7 wherein said current transformer includes a second secondary winding, said circuit means operatively connected across said second secondary winding.

9. In an electrical power supply system including a plurality of power switches, each power switch having an anode electrode, a cathode electrode and a gate electrode, said power switches rendered conductive in response to firing pulses, a combination comprising, an electrical energy storage circuit including an inductive element operatively connected to the gate electrode of each of said power switches, said electrical energy storage circuit capable of providing a continuous current to said gate electrode of said power switch, an alternating current source, a current transformer having a primary winding and a first and second secondary winding, said alternating current source connected across said primary winding, said electrical energy storage circuit connected across said first secondary winding, a circuit means operatively connected across said second secondary winding for controlling the flow of current from said electrical energy storage circuit to the gate electrode of said power switch to render said power switch conductive for a predetermined period of time, and a pulse generator circuit operatively connected across said primary winding for controlling the operation of said circuit means.

10. In apparatus claimed in claim 9 including means for operatively isolating said alternating current source from said pulse generator circuit.

11. In apparatus as claimed in claim 9 wherein said circuit means includes a conduction-controlled switching device, said conduction switching device being operatively connected in parallel with the gate-cathode circuit of said power switch.

12. In apparatus as claimed in claim 11 wherein said pulse generator circuit supplies pulses to control the ON-OFF condition of said conduction-controlled switching device, the ON condition of said conduction control switching device effectively establishing a shunting path for the stored current of said inductive element to prevent firing of said power switch to a conductive state, the OFF condition of said conduction-controlled switching device functioning to divert the stored current to the gate electrode of said power switch to render said power switch conductive.

13. In apparatus as claimed in claim 12 wherein the period of conduction of said power switch is determined by the spaced-apart relationship of the ON-OFF pulse generator circuit output pulses.